July 11, 1933.  J. E. JEWETT  1,917,718
PROCESS AND APPARATUS FOR EFFECTING ORGANIC OXIDATIONS
Filed May 31, 1930   2 Sheets-Sheet 2

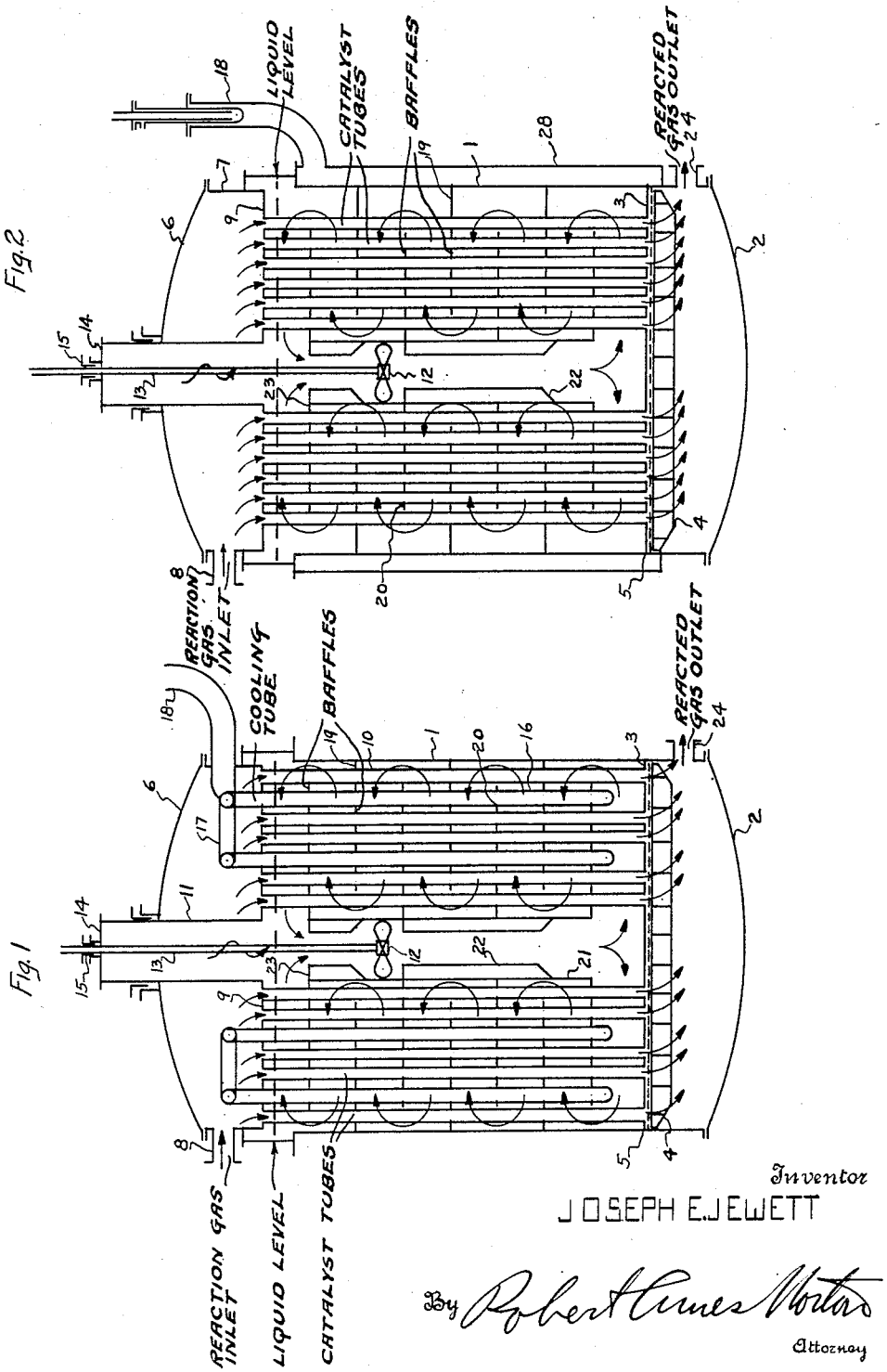

Inventor
JOSEPH E. JEWETT
By Robert James Norton
Attorney

Patented July 11, 1933

1,917,718

UNITED STATES PATENT OFFICE

JOSEPH E. JEWETT, OF MOUNT LEBANON, PENNSYLVANIA, ASSIGNOR TO THE SELDEN COMPANY, OF PITTSBURGH, PENNSYLVANIA, A CORPORATION OF DELAWARE

PROCESS AND APPARATUS FOR EFFECTING ORGANIC OXIDATIONS

Application filed May 31, 1930. Serial No. 458,416.

This invention relates to processes and apparatus for effecting organic oxidations and more particularly to such reactions of this type as require a close control of the reaction temperatures throughout the entire length of the catalyst.

Objects of the invention are to effect such temperature control in a manner suitable to the thermodynamic requirements of the reactions in question, to provide for a controlled temperature gradient between the first and the latter portions of the contact mass, and, in cases where a number of individual catalyst bodies are employed simultaneously, to maintain similar conditions in corresponding parts of each of these catalyst bodies. Further objects of the invention are to provide apparatus which will control the reactions in the manner described by means of a directed and controlled flow of a bath material surrounding the catalyst compartments and which will provide a uniform cooling of a number of catalyst compartments and at the same time permit the requisite temperature gradient therein. A still further object is to provide apparatus capable of producing the results mentioned and consisting in the combinations and elements that will be more particularly described, reference being made to the accompanying drawings.

In the catalytic oxidation of organic compounds to intermediate oxidation products, such as the oxidation of naphthalene to phthalic anhydride, anthracene to anthraquinone, toluol and its homologues to benzoic acid, benzol and its homologues and furfural to maleic acid, and the like, it has been found that the course of the reaction requires different temperature conditions in different portions of the catalyst layer. Such reactions are carried out by causing vapors of the organic compound, mixed with air or other oxidizing agent, to pass through a layer of catalyst and the reaction conditions within this catalyst layer differ considerably in its upper and lower portions. In the upper portion of the catalyst, where the preheated reaction gas mixture contains the largest percentage of the compound to be oxidized and practically none of the reaction product, the reaction proceeds at enormous velocities, and consequently requires a much higher optimum temperature than it does in the latter portions of the catalyst where much less of the conversion takes place. Likewise, since such reactions are in general decidedly and in many cases very strongly exothermic, a much larger amount of heat is generated in the first portions of the catalyst layer than in the latter portions. It will thus be seen that the first portions of the catalyst layer require more powerful cooling than do the latter portions, but that at the same time a higher temperature must be maintained in these first portions in order that the reaction may proceed properly. As a consequence, any cooling system that is powerful enough to cool properly the first portion of the catalyst is very likely to overcool the latter portions, and any cooling medium having a temperature low enough to conduct away the heat generated in the latter part of the catalyst will present difficulties in maintaining the much higher temperatures required by the earlier portions of the catalyst. Reference to Fig. 4 of the drawings will show the temperature conditions existing in various portions of a catalyst tube in which naphthalene is being oxidized to phthalic anhydride, which is a striking example of the difference in temperature conditions referred to and which is a very strongly exothermic reaction and requires very powerful cooling means to properly control its course. The present invention will be specifically described with reference to this reaction, although it is to be noted that the difficulties mentioned exist in a greater or lesser degree in all organic oxidations and that the principles exemplified in the following description of the oxidation of naphthalene to phthalic anhydride are applicable to organic oxidations generally, both of aromatic and aliphatic compounds.

In the past, organic oxidations such as those which have been mentioned, and particularly the oxidation of naphthalene to phthalic anhydride, have been carried out in converters in which the catalyst is retained in a plurality of individual catalyst compartments which are surrounded by a bath. Converters have been used in which this bath is designed to boil at or near the desired reaction temperature and thus conduct away the heat of the reaction as latent heat of vaporization, but such converters have been open to the serious objection that the entire body of the boiling liquid automatically maintains itself at the boiling temperature and thus there is no chance for the requisite temperature gradient between the earlier and later portions of the catalyst. In order to overcome this difficulty, converters have been used in which the catalyst tubes are surrounded by a non-boiling bath which has a boiling point far above the desired temperature of the reaction, and which is capable of maintaining different bath temperatures in different parts of the converter. Such converters have been used in which the flow of the bath has been directed across the catalyst tubes and through an outside cooling system by means of vertical baffles. It has also been proposed to use one or more horizontal baffles in conjunction with the vertical baffles and to utilize propelling means such as a propeller in a central well to control the circulation of the bath liquid throughout the closed system defined by the vertical and horizontal baffles. Such constructions have given very good results in commercial use but in some cases have been open to the objection that the bath liquid is cooled only once in a comparatively long travel, which has resulted in considerable temperature differences in different parts of the bath. This, in turn, has produced unequal action of the catalyst tubes, for with such a long flow of the bath liquid out of contact with the cooling zones of the converter it is inevitable that some of the tubes should be more strongly cooled than others.

I have now found that these difficulties can be overcome when the temperature regulating zones of the converter are so disposed with respect to the space occupied by the catalyst tubes that the bath can be made to pass around and over a numbr of horizontal baffles which cause it to pass frequently through the temperature regulating zones during the course of its circulation. Not only does this method of operation produce a more uniform temperature throughout horizontal zones of the converter, as the bath liquid comes under the controlling influence of the temperature regulating zone much more often during its travel, but the converter is made more compact by reason of the absence of independent outside cooling zones and is much cheaper to build.

In the accompanying drawings, in which like reference numerals designate similar parts, a few representative embodiments of the principles of the invention are shown, but the invention is not limited thereto.

In the drawings:

Fig. 1 shows a construction in which the principles of the invention are applied to a converter of the type in which temperature control is effected by means of finger tubes containing a liquid which, by boiling, controls the temperature of the bath.

Fig. 2 shows a type of construction in which heat control is effected by means of a boiling liquid in a zone remote from that of the catalyst tubes.

Figure 3:
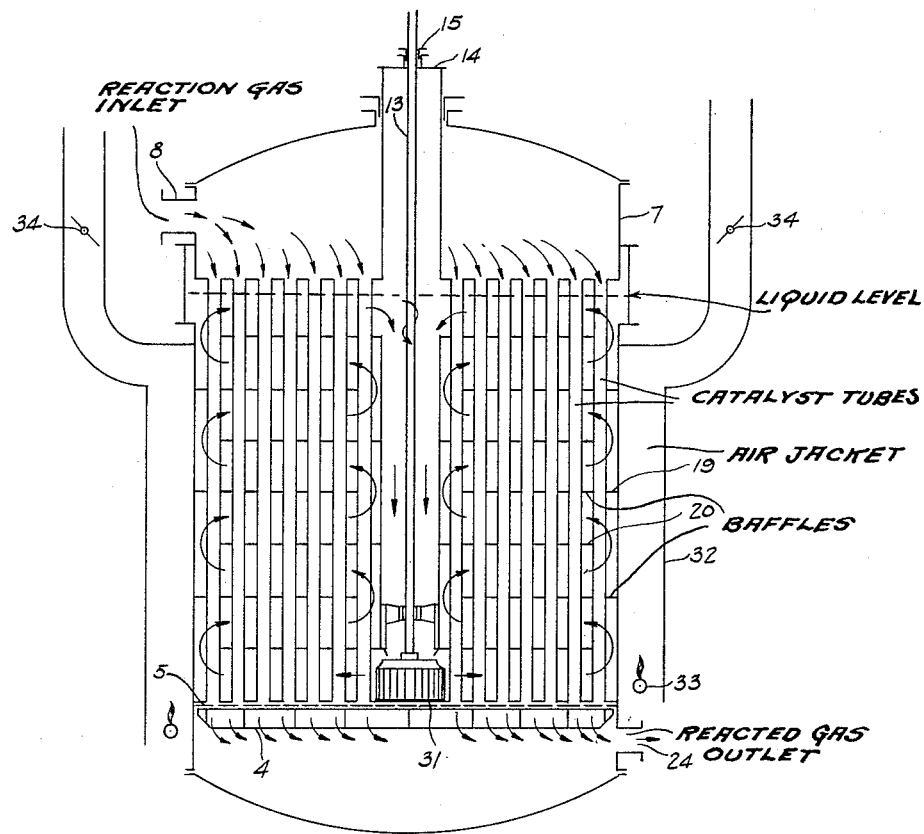
Fig. 3 shows a construction in which the bath is heated or cooled by an air jacket surrounding the converter.

Referring to Fig. 1, the converter is shown as being of the fire tube boiler type, that is to say, one in which the catalyst tubes are retained between tube sheets which are set into the upper and lower parts of the converter shell. The lower part of the converter consists of an outer shell 1 connected to bottom piece 2 and supporting the lower tube sheet 3 and the catalyst supporting grid 4 which in turn supports the catalyst retaining screen 5. The super-structure of the converter consists of a top piece 6 and an upper shell 7 provided with inlet 8 and supported by the upper tube sheet 9, from which the catalyst tubes 10 extend to the lower tube sheet 3. Set into the top piece 6 and supported by the upper tube sheet 9 is a central well 11, which is designed to permit operation of the propeller 12 by means of shaft 13 and suitable gearing which is not shown. In cases where it is necessary to prevent oxidation of the bath material by the air, the central well is closed at 14, the shaft passing through a suitable stuffing box 15, but when a non-oxidizable bath material is used, such as a nitrate-nitrite mixture, this provision is unnecessary.

Mounted within the upper tube sheet 9 and extending between the catalyst tubes 10 are rows of closed end tubes 16, which extend nearly to the bottom of the bath space defined by the lower shell 1 and the lower tube sheet and which are headed into manifolds 17 connected to refluxes 18. These closed end tubes are adapted to contain liquids having high boiling points such as mercury, mercury-alloys, hydrocarbons and the like, which boil at or near the desired bath temperature and conduct away the exortherm of the reaction.

Parallel to the tube sheets 3 and 9 and extending transversely to the catalyst tubes are sets of baffles 19 and 20, the baffles 19 being fastened to the lower converter shell 1 and the baffles 20 being set across the catalyst tubes in such a manner as to allow passage of the bath liquid along the converter shell. These baffles are all open at their centers to provide a well space in which the propeller 12 operates, and the baffles 20 are connected at their inner ends by a central tube 21 which is provided with vanes 22 and 23 to counteract swirling of the bath liquid caused by the rotation of the propeller and designed to produce a straight flow of the bath liquid.

In operation the catalyst tubes are partly or entirely filled with catalyst and the mixture of naphthalene and air, preheated to the proper temperature, is admitted at 8 and passed downwardly over the catalyst, the products of the reaction leaving the converter at 24. The bath liquid, actuated by the propeller 12 flows downwardly through the central well 21 and upwardly over the baffles as shown by the arrows, taking up excess heat from the catalyst tubes 10 and giving it up to the liquid in the closed end tubes 16, which is thereby caused to boil. The vapors are condensed in the reflux condensers and returned to the tubes by way of the manifolds 17, a close and efficient heat control being thereby effected.

Because of the comparatively short horizontal travel of the bath liquid due to the horizontal baffles it is entirely unnecessary to maintain the temperature regulating elements in the same zone as that of the catalyst tubes as has been shown in Fig. 1. On the contrary an even more advantageous construction, from the standpoint both of facility of construction and a more favorable temperature gradient, can be used in which the temperature regulating bath is placed in the shell of the converter, as shown in Fig. 2. In this figure the catalyst tubes are evenly spaced, there being no finger tubes or overhead manifolds, and consequently the converter has a greater capacity for equal size as compared with the modification of Fig. 1. The lower converter shell is provided with a jacket 28 which during operation contains a boiling liquid such as those described in connection with Fig. 1, and the vapors of which are collected in reflux condensers 18 in the manner already described. The baffles 19 and 20 are set across the catalyst tubes in the same manner as those of Fig. 1 and the central well and propeller construction are the same. In operation the bath liquid travels horizontally across the catalyst tubes and comes into contact with the converter shell which is cooled on its outer side by means of the boiling liquid in the jacket 28. The circulating bath liquid then passes back across the tubes and over the next baffle 20 and again comes into contact with the cooled converter shell, and by reason of this frequent contact no great difference exists between the temperature of a portion beneath the outer and the innermost areas of any of the horizontal baffles, although it will be apparent that the temperature of the bath liquid as a whole can be higher in the upper portions of the converter than in the lower portions. This temperature difference can be aided, if desired, by the use of insulation placed between the circulating bath and the boiling bath, that varies in thickness from the top of the converter towards the bottom, or by bringing the liquid of the boiling bath only part way up the sides of the converter, as shown in Fig. 2, or even by using upper and lower jackets containing different boiling liquids if desired. In ordinary practice, however, it will usually be found that by reason of the added heat given off in the upper portions of the tubes the temperature gradient will take care of itself. Control of the circulation speed is effected by varying the speed of the propeller 12 as in the modification of Fig. 1.

In Fig. 3 a different circulating pump and a different temperature control means are shown. Instead of the propeller 12 an impeller-agitator 31 is used, which has the advantage of producing a uniform lateral distribution of the bath liquid without the use of directing vanes such as are shown in the other modification. The temperature controlling means consist of an air jacket 32 surrounding the converter shell and provided with gas burners 33 for use in starting up and with dampers 34 for controlling the blast of air. The operation of this type of converter is exactly the same as that of Fig. 2, the transfer of heat to the air being readily effected and being in many cases, for example in reactions which are not too strongly exothermic, a much more desirable method of procedure.

Figure 4:
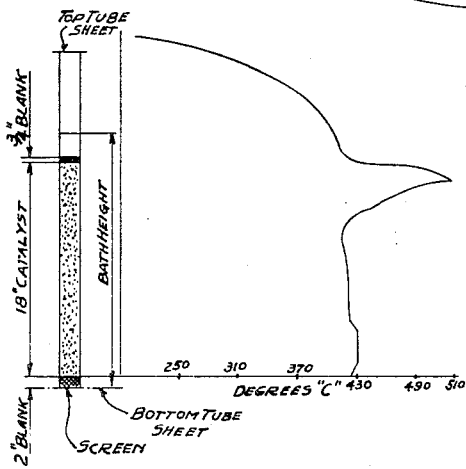
Fig. 4 is a diagrammatic representation of the temperature conditions within a catalyst tube during the oxidation of naphthalene to phthalic anhydride.

It will thus be seen from a consideration of the converters that have been described and of the requirements of the phthalic anhydride reaction as shown in Fig. 4, which reaction is indicative of the requirements of organic oxidations generally, that the present invention not only provides for a uniform temperature regulation of all the catalyst tubes but at the same time permits the desired temperature gradient between the first and last portions of the catalyst. Having reference, for example to Fig. 2, it will be seen that since only a comparatively small amount of heat is given off from the lower portions of the catalyst tubes the non-boiling bath liquid at this area has approximately the temperature of the boiling bath in the jacket 28, which bath is maintained at a temperature suitable for the requirements of the reaction in these portions of the tubes. As the bath liquid travels upwardly over the baffles, it comes into contact with portions of the catalyst tubes that are giving off more and more heat of reaction, as the reaction mixture within these tubes is richer and less impoverished and diluted by the phthalic anhydride produced. Consequently the bath liquid will take up more and more heat and, as the time of contact with the cooling liquid in the jacket 28 is the same, will tend to maintain a higher average temperature. When the portion of the bath liquid in question has reached the upper portion of the catalyst in the tubes, where the most intense reaction is taking place and where the highest reaction temperature is required, it is thus close to the optimum bath temperature at this area also, and produces no deleterious effect on the reaction. At this point, however, the temperature gradient between this portion of the bath liquid and the boiling liquid in the jacket 28 is so great that heat exchange between these two liquids takes place at a very rapid rate and there is no danger of the catalyst becoming overheated. In such a construction the boiling liquid plays a dual rôle; not only does it serve to conduct away the excess heat, but it also acts as an equalizing medium to insure that the bath liquid, at the beginning of its travel around any of the baffles 19, is always at the same temperature with respect to that particular baffle, although it permits a higher bath temperature with each succeeding baffle. Thus the bath, since it is at approximately the temperature of the portions of the catalyst tubes with which it comes into contact, exerts little if any uneven cooling action on the successive tubes as it travels across them, and any such unevenness can easily be corrected by increasing its rate of circulation.

What is claimed as new is:

1. A method of carrying out exothermic catalytic vapor phase reaction which comprises passing the reaction mixture at reaction temperatures through a plurality of substantially vertical catalyst containing compartments located in a converter shell and causing repeated passage of a bath liquid transversely across a plurality of succeeding portions of said catalyst containing compartments and through a plurality of temperature regulating zones, the succeeding portions of the catalyst compartments being progressively in a direction opposite that of the direction of flow of the reaction mixture through the catalyst.

2. A method according to claim 1, in which the flow of the bath liquid is directed by means of a plurality of horizontal baffles.

3. A method according to claim 1, in which the bath liquid of the temperature regulating zones is cooled by contact with the wall of at least one chamber containing a liquid that boils at the optimum reaction temperature in the latter portions of the catalyst tubes.

4. A method according to claim 1, in which the bath liquid of the temperature regulating zones is cooled by contact with the wall of at least one chamber containing a liquid that boils at the optimum reaction temperature in the latter portions of the catalyst tubes.

5. A catalytic converter comprising a converter shell, a lower tubesheet set into said converter shell to form therewith a bath chamber, catalyst tubes set into said tubesheet intermediate the central and peripheral portions thereof to permit a central well space, a central tube enclosing said central well space and having openings at its upper and lower ends, a bath liquid in said chamber, a plurality of horizontal baffles open at their central portions attached at their periphery to the converter shell interspersed between, parallel of horizontal baffles attached to the central tube and having a peripheral edge spaced from the converter shell and propelling means in operative relation with said central tube whereby bath liquid is caused to circulate into and out of contact with the converter shell.

6. A catalytic converter comprising a converter shell, a lower tubesheet set into said converter shell to form therewith a bath chamber, catalyst tubes set into said tubesheet intermediate the central and peripheral portions thereof to permit a central well space a central tube enclosing said central well space and having openings at its upper and lower ends, a bath liquid in said chamber, a plurality of horizontal baffles open at their central portions intermeshed with horizontal baffles extending outwardly from the central tube to a distance less than that of a converter shell and heat exchange elements immersed in the bath between said central tube and the converter shell.

7. In a catalytic converter, a plurality of vertical catalyst tubes surrounded by a bath liquid, at least one temperature regulating means in contact with said bath liquid, a plurality of horizontal baffles open at their central portions and extending at least partly across the catalyst tubes and adapted to maintain recirculation of said bath liquid, and means for effecting repeated contact of said bath liquid with successive portions of said catalyst tubes and said temperature regulating means during a single cycle of recirculation.

8. A catalytic converter comprising a circular converter shell, a circular tubesheet set into said converter shell to form therewith a bath chamber, catalyst tubes set into the intermediate portions of said tubesheet to permit a central well space, a central tube in said well space, and means to cause repeated flow of a bath liquid over successive portions of said catalyst tubes from the converter shell to the outside of the central tube and back again during a single recirculation of said bath liquid in the converter.

9. An apparatus according to claim 6, in which the temperature regulating elements are compartments adapted to contain temperature regulating fluids and extending in a direction parallel to the catalyst tubes.

10. A method of carrying out exothermic catalytic vapor phase reaction which comprises passing the reaction mixture at reaction temperatures through a plurality of substantially vertical catalyst containing compartments located in a converter shell and causing repeated passage of a bath liquid transversely across a plurality of succeeding portions of said catalyst containing compartments and through a plurality of temperature regulating zones.

Signed at Pittsburgh, Pennsylvania this 28th day of May, 1930.

JOSEPH E. JEWETT.